(12) United States Patent
Chisholm et al.

(10) Patent No.: US 6,476,157 B2
(45) Date of Patent: Nov. 5, 2002

(54) POLYESTER IONOMER COMPOSITION

(75) Inventors: Bret Ja Chisholm, Clifton Park, NY (US); Sapna H. Talibuddin, Mt. Vernon, IN (US)

(73) Assignee: General Electric Company, Pittsfield, MA (US)

(*) Notice: Subject to any disclaimer, the term of this patent is extended or adjusted under 35 U.S.C. 154(b) by 0 days.

(21) Appl. No.: 09/745,084

(22) Filed: Dec. 20, 2000

(65) Prior Publication Data

US 2002/0111440 A1 Aug. 15, 2002

(51) Int. Cl.[7] ............................................... C08L 67/02
(52) U.S. Cl. ........................ 525/438; 525/437; 525/448
(58) Field of Search ................................ 525/437, 438, 525/448

(56) References Cited

U.S. PATENT DOCUMENTS

| | | | |
|---|---|---|---|
| 2,465,319 A | 3/1949 | Whinfield et al. | |
| 3,018,272 A | 1/1962 | Griffling et al. | |
| 3,047,539 A | 7/1962 | Pengilly | |
| 3,057,827 A | * 10/1962 | Malcolm | ............... 528/295 |
| 3,546,008 A | 12/1970 | Shield et al. | |
| 4,348,500 A | * 9/1982 | Roboson | ............... 525/68 |
| 5,596,049 A | * 1/1997 | Gallucci | ............... 525/438 |
| 6,066,694 A | 5/2000 | Chisholm et al. | |

FOREIGN PATENT DOCUMENTS

EP 0940443 * 9/1999

* cited by examiner

*Primary Examiner*—Patricia A. Short

(57) ABSTRACT

An end capped polyester ionomer composition comprising alkylene aryl polyester copolymer metal sulfonate units with end capping units formed by a reaction of the polyester copolymer with an epoxy compound having at least one cyclohexane ring moiety and a terminal epoxy functional group being a substituent on at least one cyclohexane ring moiety.

30 Claims, 1 Drawing Sheet

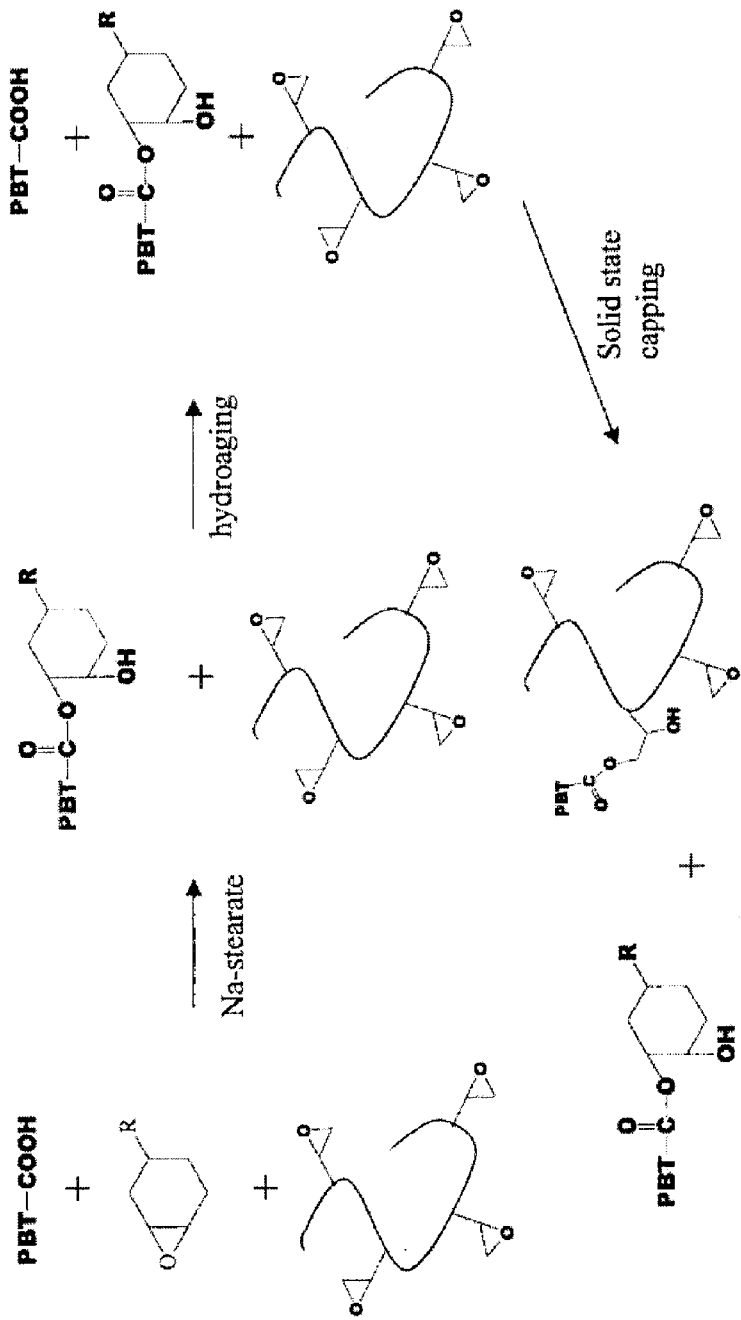
Figure 1. Schematic of an example of the two component capping system

POLYESTER IONOMER COMPOSITION

FIELD OF THE INVENTION

The invention relates to a polyester ionomer composition.

BACKGROUND OF THE INVENTION

As described in U.S. Pat. No. 6,066,694 to Chisholm et al., the utilization of alkylene aryl polyester copolymers having metal sulfonate units in blends with polycarbonate, polyester carbonates, and polyarylates can result in enhanced properties. The use of a metal sulfonate polyester copolymer modifies the rheology of the blends, especially under low shear where the melt strength is enhanced. Enhanced melt strength is very beneficial in facilitating processing under low shear conditions like blow molding and extrusion, it may also be useful for enhanced thermoformability.

Polyesters are inherently susceptible to hydrolytic degradation. Hence, it is desirable to enhance hydrolytic stability of polyester ionomer compositions.

SUMMARY OF THE INVENTION

The rate of hydrolysis of a polyester ionomer may be reduced by converting the carboxylic acid end-groups (COOH) of the polymer, which catalyze ester hydrolysis, to some other moiety that does not catalyze hydrolysis. We have found that modification of a polyester ionomer resin with two different epoxide compounds differing in both the level of epoxide functionality and the nature of substitution on the epoxide ring and catalysts, such as salts of aliphatic carboxylic acids, provides a composition which possesses good hydrolytic stability.

The end capped polyester ionomer composition comprises an alkylene aryl polyester copolymer with metal sulfonate units. The COOH end capping agents comprise a mono- or difunctional cyclic aliphatic epoxide in which the epoxy reactant compound has at least one cyclohexane ring moiety and one or two epoxy groups with at least one of the two epoxy groups being a substituent on a cyclohexane ring and a multifunctional epoxy component possessing at least 3 or more epoxide groups which are not attached to cyclohexane ring moieties.

The end caps produced by reaction of carboxylic acid end-groups of the polyester ionomer with epoxides comprise aliphatic ester groups.

To form the aliphatic ester end capping, an effective amount of the epoxy compounds for forming the end-groups and an effective amount of a catalyst compound are desirable with the polyester ionomer composition.

The combination of a mono- or difunctional cyclic aliphatic epoxide in which at least one epoxide group is a substituent on a cyclohexane ring and a multifunctional epoxide in which the epoxide groups are not attached to cyclohexane ring moieties provides improved hydrolytic stability without substantially reducing the flowability of the composition.

The higher reactivity of the mono- or difunctional cyclic aliphatic epoxide component as compared to the multifunctional epoxy component allows for selective capping of the COOH end-groups of the polyester ionomer by the mono- or difunctional cyclic aliphatic epoxy component during melt processing of the composition and results in the multifunctional epoxy component being largely unreacted during melt processing of the composition. Selective capping by the mono- or difunctional epoxide component during melt processing of the material desirably allows for capping of COOH end-groups without substantial viscosity build and makes available epoxide groups from the multifunctional epoxy component for reaction with polyester ionomer acid groups generated from hydrolysis reactions during the service life of a molded part. Reaction of polyester ionomer acid end-groups during the service life by the multifunctional epoxy component serves to maintain mechanical properties since the overall molecular weight of the composition is more adequately maintained by reaction of the polyester ionomer acid end-groups with the multifunctional epoxy component as compared to reaction of polyester ionomer acid end-groups with the mono- or difunctional epoxy component.

The higher reactivity of the cyclic aliphatic epoxy component relative to the multifunctional epoxy component is due to the greater epoxide ring strain resulting from the epoxide being a substituent on a cyclohexane ring.

DRAWINGS

FIG. 1 illustrates a schematic reaction display.

DETAILED DESCRIPTION OF PREFERRED EMBODIMENTS

Polyester ionomers with improved hydrolytic stability were produced. The compositions of the present invention exhibit improved results over compositions without epoxides as well as compositions with a single epoxide.

Two different COOH capping agents (reagents capable of reacting with COOH groups) are desirable as a means to improve the hydrolytic stability of polyester ionomer compositions. A monofunctional or difunctional COOH capping agent is used together with a multifunctional capping agent. The reactivity of the mono- or difunctional capping agent is higher than that of the multifunctional capping agent. The mono- or difunctional capping agent is sufficiently reactive to react with acid end-groups during processing, eliminating a substantial or undesirable increase in melt viscosity that would otherwise result if substantial reaction would occur between COOH end-groups and the multifunctional capping agent. An undesirable increase in viscosity interferes with forming articles or parts by forming operations such as molding, extrusion or other techniques. With the correct reactivity, a substantial portion of the COOH end-groups present in the ionomer are selectively reacted with the mono- or difunctional capping agent during the extrusion process, leaving the multifunctional capping agent to remain essentially unreacted during the typical melt processing of the material. The multifunctional capping agent desirably reacts with COOH end-groups generated from hydrolysis reactions occurring during the service life of the molded part. Reaction of polyester ionomer acid end-groups during the service life by the multifunctional capping agent serves to maintain mechanical properties since the overall molecular weight of the composition is more adequately maintained by reaction of the polyester ionomer acid end-groups with the multifunctional capping component as compared to reaction of polyester ionomer acid end-groups with the mono- or difunctional capping agent.

Compounds containing epoxy groups, generally, show good reactivity toward carboxylic acid groups when combined with a catalyst such as salts of aliphatic or aromatic carboxylic acids. The reaction of a carboxylic acid end-group of a polyester with an epoxide results in the formation of an ester end-group.

The term polyester ionomer, or sulfonate polyester or metal sulfonate polyester, refers to polyester polymers derived from the reaction residue of an aryl carboxylic sulfonate salt, an aromatic dicarboxylic acid, an aliphatic diol or any of their ester forming derivatives. The ionomer polyester polymers comprise some monovalent and/or divalent sulfonate salt units represented by the formula IA or IB.

IA:

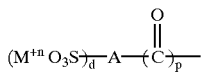

$$(M^{+n}O_3S)_d\text{—}A\text{—}(OR''O)_p\text{—}$$

IB where $p=1-3$, $d=1-3$, $p+d=2-6$, M is a metal, and A is an aryl group containing one or more aromatic rings where the sulfonate substituent is directly attached to an aryl ring, R" is a divalent alkyl group and the metal sulfonate group is bound to the polyester through ester linkages.

A is an aryl group containing one or more aromatic rings: for example, benzene, naphthalene, anthracene, biphenyl, terphenyl, oxy diphenyl, sulfonyl diphenyl or alkyl diphenyl. The aryl groups may contain one or more sulfonate substituents; $d=1-3$ and may have one or more carboxylic acid linkages; $p=1-3$. Groups with one sulfonate substituent ($d=1$) and two carboxylic linkages ($p=2$) are preferred. M is a metal, $n=1-5$. Preferred metals are alkaline or alkaline earth metals where $n=1-2$. Zinc and tin are also preferred metals. R" is a alkyl group, for example, —CH$_2$CH$_2$—, —CH$_2$CH$_2$OCH$_2$CH$_2$—, —CH(CH$_3$)CH$_2$—, CH$_2$CH$_2$CH$_2$—, —CH$_2$CH$_2$CH$_2$CH$_2$—.

Typical sulfonate substituents that can be incorporated into the metal sulfonate polyester copolymer may be derived from the following carboxylic acids or their ester forming derivatives; sodium sulfo isophthalic acid, potassium sulfo terephthalic acid, sodium sulfo naphthalene dicarboxylic acid, calcium sulfo isophthalate, potassium 4,4'-di (carbomethoxy) biphenyl sulfonate, lithium 3,5-di (carbomethoxy)benzene sulfonate, sodium p-carbomethoxy benzene sulfonate, dipotassium 5-carbomethoxy-1,3-disulfonate, sodio 4-sulfo naphthalene-2,7-dicarboxylic acid, 4-lithio sulfophenyl-3,5-dicarboxy benzene sulfonate, 6-sodiosulfo-2-naphthyl-3,5-dicarbomethoxy benzene sulfonate and dimethyl 5-[4-(sodiosulfo) phenoxy] isophthalate. Other suitable sulfonate carboxylic acids and their ester forming derivatives are described in U.S. Pat. Nos. 3,018, 272 and 3,546,008 which are included herein by reference. The most preferred sulfonate polyesters are derived from dimethyl-5-sodiosulfo-1,3-phenylenedicarboxylate.

Preferred ionomer polyester polymer comprises divalent ionomer units represented by the formula II:

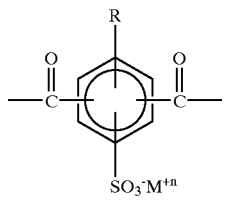

wherein R is hydrogen, halogen, alkyl or aryl; M is a metal, and n is 1–5.

A preferred polyester ionomer has the formula III:

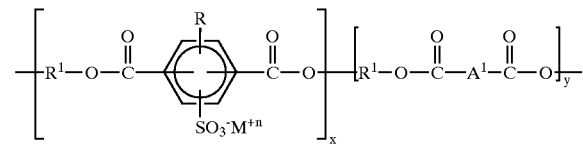

where the ionomer units, x, are from 0.1–50 mole percent of the polymer with 0.5 to 20 mole percent being preferred. X+y is equal to 100 mole percent. Most preferably R is hydrogen. When R is hydrogen, A$^1$ is phenylene, and R$^1$ is an alkylene radical of from C$^1$–C$^{12}$, preferably from C$^2$ or C$^4$, and x and y are in mole percent, then x is from about 0.5 to about 20 percent, and more preferably from about 0.5 to about 10 percent. A preferred polyester ionomer has the following formula IV:

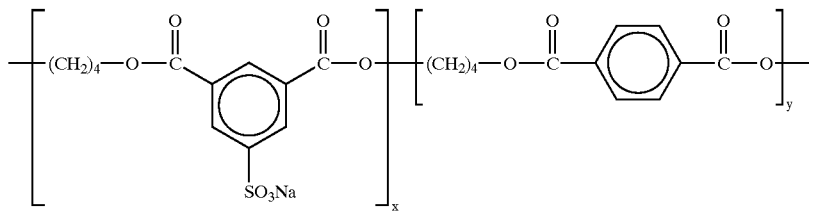

where x and y are understood to be randomly distributed along the polymer backbone.

Typical glycol or diol reactants, R$^1$, include straight chain, branched, or cycloaliphatic alkane diols and may contain from 2 to 12 carbon atoms. Examples of such diols include but are not limited to ethylene glycol; propylene glycol, i.e., 1,2- and 1,3-propylene glycol; butane diol, i.e., 1,3- and 1,4-butane diol; diethylene glycol; 2,2-dimethyl-1,3-propane diol; 2-ethyl, 2-methyl, 1,3-propane diol; 1,3- and 1,5-pentane diol; dipropylene glycol; 2-methyl-1,5-pentane diol; 1,6-hexane diol; dimethanol decalin, dimethanol bicyclo octane; 1,4-cyclohexane dimethanol and particularly its cis- and trans-isomers; triethylene glycol; 1,10-decane diol; and mixtures of any of the foregoing. A preferred cycloaliphatic diol is 1,4-cyclohexane dimethanol or its chemical equivalent. When cycloaliphatic diols are used as the diol component, a mixture of cis- to trans-isomers may be used, it is preferred to have a trans isomer content of 70% or more. Chemical equivalents to the diols include esters, such as dialkyl esters, diaryl esters and the like.

Examples of aromatic dicarboxylic acid reactants, as represented by the dicarboxylated residue A$^1$, are isophthalic or terephthalic acid, 1,2-di(p-carboxyphenyl)ethane, 4,4'-dicarboxydiphenyl ether, 4,4'bisbenzoic acid and mixtures thereof. All of these acids contain at least one aromatic nucleus. Acids containing fused rings can also be present, such as in 1,4-1,5- or 2,6-naphthalene dicarboxylic acids. The preferred dicarboxylic acids are terephthalic acid, isophthalic acid or mixtures thereof.

The most preferred ionomer polyesters are poly(ethylene terephthalate) (PET) ionomers, and poly(1,4-butylene terephthalate) ionomers, (PBT), and (polypropylene terephthalate) (PPT) ionomers.

Also contemplated herein are the above polyester ionomers with minor amounts, e.g., from about 0.5 to about 15 percent by weight, of units derived from aliphatic acid and/or aliphatic polyps to form copolyesters. The aliphatic polyols include glycols, such as poly(ethylene glycol) or poly(butylene glycol). Such polyesters can be made following the teachings of, for example, U.S. Pat. Nos. 2,465,319 and 3,047,539.

The preferred poly(1,4-butylene terephthalate) ionomer resin used in this invention is one obtained by polymerizing an ionomer component comprising a dimethyl 5-sodiosulfo-1,3-phenylenedicarboxylate, from 0.5 to 10 mole %, a glycol component of at least 70 mole %, preferably at least 90 mole %, of tetramethylene glycol and an acid component of at least 70 mole %, preferably at least 90 mole %, of terephthalic acid, and polyester-forming derivatives therefore.

The glycol component should contain not more than 30 mole %, preferably not more than 20 mole %, of another glycol, such as ethylene glycol, trimethylene glycol, 2-methyl-1,3-propane glycol, hexamethylene glycol, decamethylene glycol, cyclohexane dimethanol, or neopentylene glycol.

The acid component should contain not more than 30 mole %, preferably not more than 20 mole %, of another acid such as isophthalic acid, 2,6-naphthalene dicarboxylic acid, 1,5-naphthalene dicarboxylic acid, 4,4'-diphenyldicarboxylic acid, 4,4'-diphenoxyethane dicarboxylic acid, p-hydroxy benzoic acid, sebacic acid, adipic acid and polyester-forming derivatives thereof.

It is also possible to use a branched polyester ionomer in which a branching agent, for example, a glycol having three or more hydroxyl groups is used to produce a branched polymer.

Blends of polyesters may also be employed in the composition. As indicated earlier, preferred polyester blends are made from poly(ethylene terephthalate) and poly(1,4-butylene terephthalate).

A monofunctional epoxy compound is a substituted cyclohexene oxide or any compound containing a single epoxide group attached to a cyclohexane ring. Examples of monofunctional cyclic aliphatic epoxides include: cyclohexene oxide, 3,4-epoxy-1-methyl-6-acetoxymethylcyclohexane, 7-oxatricyclo(4.1.0)-heptane-3,4-dicarboxylate, 7-oxabicyclo[4.1.0)]heptan-2-one, 2-alpha, 3-alpha-epoxy-5-alpha-cholestane, 3,4-epoxycholestane, 4-vinylcyclohexene dioxide, and 2-(3,4,-epoxycyclohexyl) ethyltrimethoxysilane. Especially preferred is 7-oxatricyclo (4.1.0)-heptane-3,4-dicarboxylate.

A difunctional cyclic aliphatic epoxide is a epoxy compound having at least one cyclohexane ring moiety and two epoxy groups with at least one of the two epoxy groups being a substituent on a cyclohexane ring. Examples of a difunctional cyclic aliphatic epoxy compound include: 3,4-epoxycyclohexylmethyl-3,4-epoxycyclohexylcarboxylate, 3,4-epoxy-6-methylcyclohexylmethyl-3,4-epoxy-6-methyl-cyclohexane carboxylate, bis(3,4-epoxycyclohexylmethyl) adipate, vinylcyclohexene di-epoxide, epoxy cyclohexane adducts of carboxylic acids and the like. Especially preferred is 3,4-epoxycyclohexyl-3,4 epoxycyclohexylcarboxylate.

The preferred catalysts are salts of an aliphatic or aromatic carboxylic acid. The most preferred catalysts are Group IA (alkaline) metal carboxylates.

The epoxy component which is reacted during processing or shaping of the resin is a monofunctional or difunctional epoxy compound. By difunctional epoxy compound is meant a compound having two terminal epoxy functionalities. By monofunctional epoxy compound is meant a compound having one terminal epoxy functionality. Preferably the compound will contain only carbon, hydrogen and oxygen. The compound will preferably have a molecular weight below about 1000 g./mole to facilitate blending with the polyester resin. The mono- or difunctional epoxy compound has a sufficient low molecular weight so that the effective amount is low enough to avoid deleterious effects to mechanical properties and melt viscosity.

The mono- or difunctional epoxide compounds can be made by techniques well known to those skilled in the art. For example, the corresponding alpha, beta-dihydroxy compounds can be dehydrated to produce the epoxide groups, or the corresponding unsaturated compounds can be epoxidized by treatment with a peracid, such as peracetic acid, using well-known techniques. The compounds are also commercially available.

The mono- or difunctional epoxy compound may be employed in any effective amount, but preferably small amounts are used, e.g., at a range of about 0.1 to about 5 percent by weight. However, a particularly preferred range is from about 0.5 to about 4.0 percent by weight. A more preferred range is from about 1.0 to about 4.0 percent by weight.

Typical multifunctional capping agents are novalac epoxide, epoxy functional polyethylene copolymers, epoxy functional styrenic copolymers, and epoxy functional polyacrylate copolymers. The multifunctional capping agent preferably has three or more reactive terminal epoxy sites, and even more preferably 4 or more. It is also desirable to add the multifunctional epoxy to the resin mixture during the shaping or forming process after the mono- or difunctional epoxy has been added. As a result of the subsequent addition of the multifunctional capping agent, it is more efficiently utilized during the service life of the shaped object.

The multifunctional epoxide compounds can be made by techniques well known to those skilled in the art. For example, various epoxy-based copolymers can be produced by free radical copolymerization or emulsion copolymerization using an epoxy functional comonomer such as glycidyl methacrylate.

The multifunctional epoxy compound should be present in an amount less than the amount that results in a deleterious degradation of impact properties or a substantial increase in melt viscosity, typically less than about 5 percent by weight. The effective amount is typically greater than about 1 percent by weight depending on the equivalent weight of epoxy. All percentages are based on the total weight of the blend.

Another component of the present invention consists of the catalyst compound. Preferred catalysts are salts free from direct carbon-phosphorous bonds and containing at least one of alkali metal cations and alkaline earth metal cations. It is apparent that this class contains a large number of compounds. They include alkali metal carboxylates and alkali metal carbonates. Illustrative compounds within this class are sodium acetate, sodium benzoate, sodium caproate, sodium stearate, and potassium oleate.

The catalyst component can be present in the composition of the present invention in any effective amount. Preferably the catalyst is present in an amount ranging from about 0.001 to about 1 weight percent, more preferably from about 0.03 to about 0.3 weight percent based on the total weight of the resin composition.

Carbodiimides can also be used in combination with the epoxides and catalyst of the present invention to improve hydrolysis resistance. Both monomeric and polymeric carbodiimides can be used although polymeric carbodiimides may be preferred due to the potential for lower plate out. Carbodiimides of the following structure may be used:

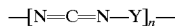

where Y is an aromatic, aliphatic or alkyl substituted aromatic radical of from 2 to 20 carbon atoms. Generally n=1–50. Y=alkyl substituted aryl groups are most preferred. The combination of epoxide with carbodiimide gives surprisingly better color and extends the effectiveness of the more expensive carbodiimide. Overall lower levels of carbodiimide in the blends may reduce the potential generation of unwanted isocyanates by reaction of carbodiimide with water. The epoxy carbodiimide combination reduces carbodiimide loading while retaining good hydrolysis resistance with improved color over the epoxide alone. Carbodiimide loadings of 0.01 to 5.0% are preferred.

The composition of the present invention may include additional components which do not interfere with the previously mentioned desirable properties but enhance other favorable properties.

EXAMPLES

The following examples illustrate the present invention, but are not meant to be limitations to the scope thereof.

This invention involves the use of two different COOH capping agents (reagents capable of reacting with COOH groups) as a means to improve the hydrolytic stability of polyester ionomer compositions especially PBTI poly (butylene terephthalate) ionomer compositions. A mono- or difunctional COOH capping agent is used together with a multifunctional capping agent in which the reactivity of the mono- or difunctional capping agent is significantly higher than that of the multifunctional capping agent. With the correct reactivities, most all of the COOH endgroups present in the PBTI are selectively reacted with the mono- or difunctional capping agent during the extrusion process, leaving the multifunctional capping agent to remain essentially unreacted during melt processing of the material.

A schematic of a potential two component capping system for PBTI based on this approach is shown in FIG. 1. This system utilizes a cycloaliphatic epoxide as the mono- or difunctional capping agent and a polymeric, glycidic epoxide capping agent as the multifunctional capping agent. Cycloaliphatic epoxides are more reactive than glycidic epoxides due to the greater epoxide ring strain of the former.

Based on the schematic displayed in FIG. 1, examples 1–4 were generated utilizing 3,4-epoxycyclohexylmethyl-3,4-epoxycyclohexylcarboxylate (Bakelite® ERL4221) and a novalac epoxy (Araldite® ECN1299) as capping agents for glass-filled PBTI. ERL4221 was to serve as the more reactive epoxide. Since ERL4221 was used at a 50% molar excess relative to COOH end-groups, chain coupling was expected to be minimal. The novalac epoxide serves as the multifunctional, glycidic epoxide capping agent described in the model (FIG. 1).

Sample compositions and test results are presented in Table 1. Examples 1–4 illustrate different techniques used to incorporate the novalac epoxy into the blend composition while Example A is provided as a comparative example. Comparative Example A and Example 1 were prepared by tumble-blending their respective components and extruding the mixtures on a 2.5" 30:1 L/D HPM single-screw extruder equipped with a vacuum vented, double-wave screw, at 100 rpm and a barrel set temperature of 250–260° C. The extrudates were cooled in a water bath and chopped into pellets. Example 2 was prepared by first compounding the ingredients tagged with an asterisk on a 30 mm twin-screw extruder equipped with a pair of vacuum-vented co-rotating screws, at 300 rpm and a barrel set temperature of 250–260° C. The extrudate was cooled in a water bath and chopped into pellets which were subsequently dry blended with the remaining ingredients and re-extruded using the same compounding procedure used for Examples A and 1. In the case of Examples 3 and 4, only the ingredients tagged with an asterisk were compounded in the manner described for Examples A and 1, and the remaining ingredient, namely, the novalac epoxy (ECN1299), was admixed with the compounded pellets just before injection molding.

Comparative Example A and Examples 1–3 were dried at 87–93° C. in a convection oven for 3 hours before injection molding into test specimens. Example 4 was molded without prior drying. All of the samples were injection molded on an 85 ton Van Dorn molding machine with a barrel set temperature of 260–265° C., 65° C. mold temperature, 10 s injection time, 20 s hold time and 100 psi back pressure. ASTM type V tensile bars and Izod bars of 0.125" thickness were molded and aged by suspending these above water in a pressure steam sterilizer, Model No. 25X, Wisconsin Aluminum Foundry Company, at 100% relative humidity, 120° C. temperature and 1 kg/cm$^2$ pressure. After each exposure, samples were held under ambient conditions prior to testing. Tensile and unnotched Izod impact tests were conducted as per ASTM D638 and ASTM D256 procedures, respectively. In addition, melt viscosity was measured at 250° C. on dry pellets obtained from the extrusion process for Examples A, 1, and 2, and dry, pellets cut from molded parts for Examples 3 and 4 using a Tinius Olsen model UE4-78 rheometer equipped with a 0.0825" diameter orifice and 5 kgf weight.

TABLE 1

| Example | A↑ | 1 | 2 | 3 | 4↓ |
|---|---|---|---|---|---|
| Polyester$^a$ | 66.42 | 58.42 | 59.80* | 56.78* | 56.78* |
| ERL4221$^c$ | 2.3 | 2.3 | 1.43* | 2.07* | 2.07* |
| Polyethylene | 1.00 | 1.00 | 0.60* | 0.90* | 0.90* |
| Borosilicate E glass, chopped strand | 30.00 | 30.00 | 30.00 | 30.00* | 30.00* |
| Stabilizer | 0.20 | 0.20 | 0.12* | 0.18* | 0.18 |
| Sodium Stearate | 0.08 | 0.08 | 0.05 | 0.07* | 0.07* |
| ECN1299/ethylene ethyl acrylate$^b$, (25/75 by weight) | 0.00 | 8.00 | 8.00 | 10.00 | 10.00 |
| Total | 100 | 100 | 100 | 100 | 100 |
| Melt Viscosity, pellet (poise) | 4150 | 6716 | 10324 | 6892 | 7225 |
| PRESSURIZED STEAM AGING Tensile Strength (kpsi) | | | | | |
| As-molded | 16.1 | 15.8 | 16.2 | 14.2 | 14.0 |
| Aged 2 Days | 2.60 | 6.95 | 7.59 | 9.40 | 9.07 |
| Aged 4 Days | 3.87 | 4.18 | 3.44 | 3.18 | 3.39 |
| Unnotched Izod Impact (ft-lb/in) | | | | | |
| As-molded | 9.40 | 13.9 | 16.6 | 14.1 | 14.9 |
| Aged 2 Days | 0.97 | 3.40 | 4.50 | 4.00 | 4.50 |
| Aged 4 Days | 0.99 | 1.90 | 1.60 | 1.40 | 1.00 |

↑= Comparative Example
↓= Sample was molded without oven drying

TABLE 1-continued a= Poly(1,4-butylene terephthalate) sulfonated with 3 mole % sodiosulfonatoisophthalic acid ester.
b= ECN1299 is an epoxy ortho-cresol Novalac resin. For ease of handling, ECN1299 was used in the form of a pelletized 25/75 ECN/Ethylene ethyl acrylate concentrate. As such, levels of 8 and 10% concentrate used in the above examples correspond to actual ECN1299 levels of 2.0 and 2.5%, respectively.
c= 3,4-epoxycyclohexylmethyl-3,4-epoxycyclohexyl carboxylate
d= For Examples 3 and 4, melt viscosity was measured on as-molded samples since ECN1299 was not compounded with the rest of the ingredients.

The addition of the novalac epoxy (Examples 1–4) offers a considerable increase in hydrolytic resistance versus 3,4-epoxycyclohexylmethyl-3,4-epoxycyclohexylcarboxylate alone (Example A) as demonstrated by the higher mechanical properties obtained after conditioning in the humid environment. In addition, the process used to incorporate the novalac epoxy into the sample vastly alters the melt processability of the blended product, as indicated by the melt viscosity results. Clearly, the methods of single-pass extrusion (Example 1) and inclusion of the novalac resin through the molding process (Examples 3 and 4) yield a significantly lower blend viscosity compared to the dual-pass extrusion method (Example 2). The lower melt viscosity is advantageous for injection molding thin-walled parts such as automotive underhood connectors and relays that require both good flowability and good hydrolytic stability.

Table 2 provides an example of an unfilled PBTI composition. For this example, a comparison was made between PBTI produced using the two component epoxy package and analogous materials containing just one of the epoxy components. The level of ERL 4221 and ECN 1299 used in comparative example C and reference material D, respectively, were chosen to provide an equivalent epoxy functional group content as that of Example 5. Melt viscosity was determined at 250° C. using a parallel plate rheometer and a shear rate of 10 radians/sec.

TABLE 2

| Example | B | C | D | 5 |
| --- | --- | --- | --- | --- |
| PBTI | 100.0 | 96.85 | 94.19 | 95.92 |
| ERL 4221 | 0.00 | 3.07 | 0.00 | 2.00 |
| Sodium Stearate | 0.00 | 0.08 | 0.08 | 0.08 |
| ECN 1299 | 0.00 | 0.00 | 5.73 | 2.00 |
| Total | 100 | 100 | 100 | 100 |
| Melt Viscosity, pellet (poise) | 4,700 | 1,700 | 63,400 | 6,000 |
| PRESSURIZED STEAM AGING Unnotched Izod Impact (ft-lb/in) | | | | |
| As-molded | — | 21.7 | 26.0 | NB* |
| Aged | — | 0.9 | 6.9 | 2.0 |

*NB - Sample did not break when impact tested.

It was clear from visual observation of the melt of reference D as well as from the Theological data that the material was highly viscous. In addition, it was very difficult to mold parts from reference D. Example 5 clearly shows the best balance of impact strength, both before and after aging at high humidity, and flow.

What is claimed is:

1. An end capped polyester ionomer composition comprising an alkylene aryl polyester copolymer with metal sulfonate units having end capping units comprising cyclic aliphatic ester groups formed by the reaction of acid carboxy groups of the polyester copolymer with a first epoxy reactant and a second epoxy reactant, said first epoxy reactant having at least one cyclohexane ring moiety and an epoxy functional group being a substituent on at least one cyclohexane ring moiety, and wherein said first epoxy reactant comprises a monofunctional or a difunctional epoxy compound, and said second epoxy reactant comprises a multifunctional epoxy compound having a reactivity lower than said first epoxy reactant.

2. An end capped polyester ionomer resin composition according to claim 1 wherein said polyester copolymer has metal sulfonate units represented by the formula IA;

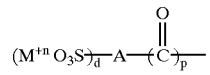

or the formula IB:

where p=1–3, d=1–3, p+d=2–6, n=1–5, M is a metal, and A is an aryl group containing one or more aromatic rings where the sulfonate substituent is directly attached to an aryl ring, R" is a divalent alkyl group and the metal sulfonate group is bound to the polyester Bough ester linkages.

3. An end capped polyester ionomer composition according to claim 2 where p=2, d=1, and M is zinc, tin, alkaline or alkaline earth metal.

4. An end capped polyester ionomer composition of claim 1 having the formula:

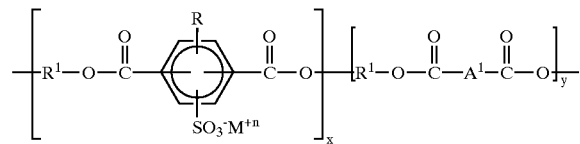

wherein the ionomer units, x, are from 0.1–50 mole %, R is halogen, alkyl, aryl, alkylaryl or hydrogen, $R^1$ is derived from a diol reactant comprising straight chain, branched, or cycloaliphatic alkane diols and containing from 2 to 12 carbon atomns, $A^1$ is a divalent aryl radical, and x+y is equal to 100 mole percent.

5. An end capped polyester ionomer composition according to claim 4 wherein R is hydrogen, x=0.5–10 mole percent, R1 is C2–C8 alkyl, and A1 is derived from iso- or terephthalic acid or a mixture of the two.

6. An end capped polyester ionomer resin composition according to claim 5 wherein $R^1$ is the residue from a diol component selected from the group consisting essentially of ethylene glycol, propanediol, butanediol, or cyclohexanedimethanol, and derivatives thereof.

7. An end capped polyester ionomer composition of claim 5 where the metal sulfonate salt is iso- or tere- sulfo phthalate.

8. An end capped polyester ionomer composition according to claim 1 wherein said difunctional epoxy compound comprises 3,4-epoxycyclohexylmethyl-3, 4epoyxcyclohexylcarboxylate.

9. An end capped polyester ionomer resin corrposition of claim 1 having the formula:

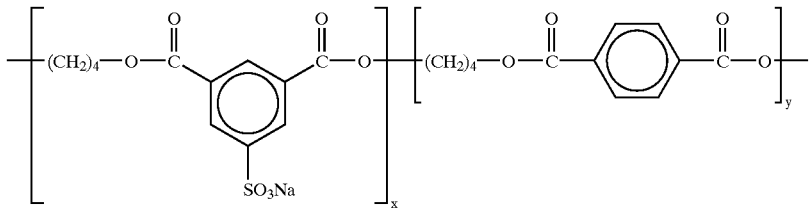

where the copolymer is a random copolymer of x and y units, and x+y is equal to 100 mole percent.

10. An end capped polyester ionomer composition of claim 9 wherein x is from about 0.5 to about 20 mole percent.

11. An end capped polyester ionomer composition of claim 9 wherein x is from about 1 to about 10 mole percent.

12. An end capped polyester ionomer composition of claim 1 wherein said monofunctional or difunctional epoxy compound is present in an amount ranging from about 0.1 to about 5.0 weight percent based on the total weight of the composition.

13. An end capped polyester of claim 12 wherein said monofunctional or difunctional epoxy compound is present in an amount ranging from about 1 to about 4.0 weight percent based on the total weight of the composition.

14. An end capped polyester composition as defined in claim 13 wherein a catalyst compound is present in an amount ranging from about 0.001 to about 1 weight percent based on the total weight of the composition.

15. An end capped polyester composition of claim 14 comprising 0.1–5.0% of a carbodiimide.

16. An end capped polyester ionomer resin composition comprising an alkylene aryl polyester copolymer with metal sulfonate units having end capping units comprising cyclic aliphatic ester groups formed by the reaction of acid carboxy groups of the polyester copolymer with an epoxy reactant, said epoxy reactant comprising a monofunctional or difunctional epoxy compound having at least one cyclohexane ring moiety and an epoxy functional group being a substituent on at least one cyclohexane ring moiety, wherein said resin composition comprises a multifunctional epoxy compound having a reactivity lower than said monofunctional or said difunctional epoxy reactant.

17. An end capped polyester ionomer resin composition according to claim 16 wherein polyester copolymer has metal sulfonate units represented by the formula IA:

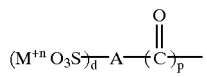

or the formula IB:

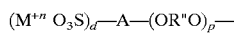

where p=1–3, d=1–3, p+d=2–6, n=1–5, M is a metal, and A is an aryl group containing one or more aromatic rings where the sulfonate substituent is directly attached to an aryl ring, R" is a divalent alkyl group and the metal sulfonate group is bound to the polyester through ester linkages.

18. An end capped polyester ionomer composition according to claim 17 where p=2, d=1, and M is zinc, tin, alkaline or alkaline earth metal.

19. An end capped polyester ionomer composition of claim 16 having the formula:

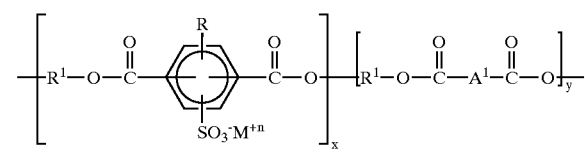

wherein the ionomer units, x, are from 0.1–50 mole %, R is halogen, alkyl, aryl, alkylaryl or hydrogen, $R^1$ is derived from a diol reactant comprising straight chain, branch or cycloaliphatic alkane diols and containing from 2 to 12 carbon atoms, $A^1$ is a divalent aryl radical, and x+y is equal to 100 mole percent.

20. An end capped polyester ionomer composition according to claim 19 wherein R is hydrogen, x=0.5–10 mole percent, R1 is C2–C8 alkyl, and A1 is derived from iso- or terephthalic acid or a mixture of the two.

21. An end capped polyester ionomer resin composition according claim 20 wherein $R^1$ is the residue from a diol component selected from the group consisting essentially of ethylene glycol, propanediol, butanediol, or cyclohexanedimetanol, and derivatives thereof.

22. An end capped polyester ionomer composition of claim 20 where the metal sulfonate salt is iso- or tere- sulfo phthalate.

23. An end capped polyester ionomer composition according to claim 16 wherein said wherein said difunctional epoxy compound comprises 3,4-epoxycyclohexylmethyl-3,4-epoxycyclohexylcarboxylate.

24. An end capped polyester ionomer resin composition of claim 16 having the formula:

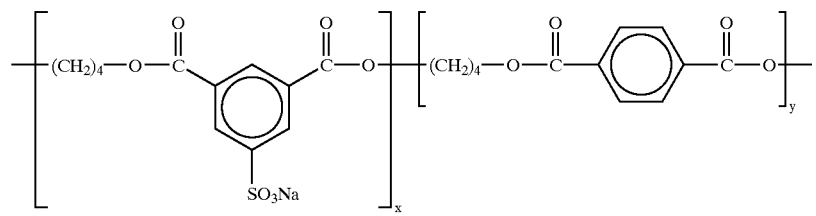

where the copolymer is understood to be a random copolymer of x and y units, and x+y is equal to 100 mole percent.

25. An end capped polyester ionomer composition of claim 24 wherein x is from about 0.5 to about 20 mole percent.

26. An end capped polyester ionomer composition of claim 24 wherein x is from about 1 to about 10 mole percent.

27. A process for forming a hydrolysis resistant polyester ionomer product comprising:
preparing a mixture comprising:
a polyester ionomer resin having acid carboxy end groups and a first epoxy reactant and a second epoxy reactant wherein:
said first epoxy reactant has at least one cyclohexane ring moiety and an epoxy functional group being a substituent on at least one cyclohexane ring moiety and wherein said first epoxy reactant comprises a monofunctional or a difunctional epoxy compound; and
said second epoxy reactant comprises a multifunctional epoxy compound having a reactivity lower than said first epoxy reactant;

forming said mixture into a shaped article; and reacting said first epoxy reactant with said carboxy end groups of said polyester ionomer resin during shaping to form a hydrolysis resistant article.

28. A process according to claim 27 wherein said multifunctional epoxy compound is substantially unreacted during forming said hydrolysis resistant article.

29. A process according to claim 28 wherein said multifunctional epoxy compound reacts with said acid carboxy groups after said processing.

30. A process according to claim 28 wherein said multifunctional epoxy compound is introduced into said mixture subsequent to the introduction of said monofunctional or difunctional epoxy compound into said mixture.

* * * * *